M. M. FORD.
TOOL HANDLE.
APPLICATION FILED MAY 4, 1915.
1,202,698.  Patented Oct. 24, 1916.
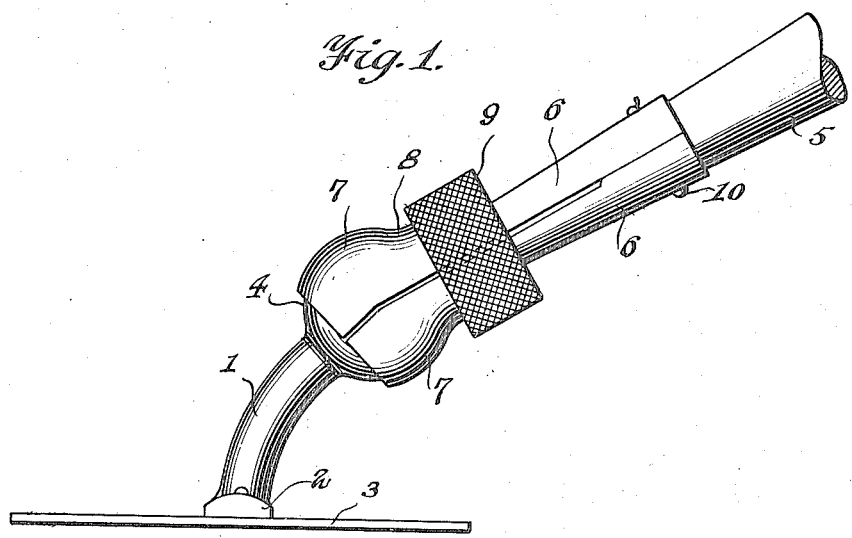
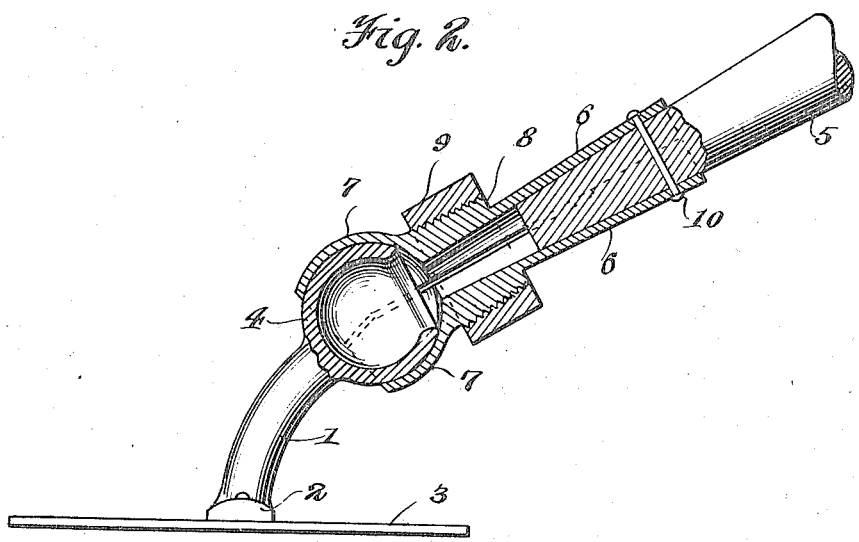
Witnesses
Inventor
Martin M. Ford.
By Victor J. Evans
Attorney

UNITED STATES PATENT OFFICE.

MARTIN M. FORD, OF RIDGE, MONTANA.

TOOL-HANDLE.

1,202,698.  Specification of Letters Patent.  Patented Oct. 24, 1916.

Application filed May 4, 1915. Serial No. 25,868.

*To all whom it may concern:*

Be it known that I, MARTIN M. FORD, a citizen of the United States, residing at Ridge, in the county of Custer and State of Montana, have invented new and useful Improvements in Tool-Handles, of which the following is a specification.

This invention is an improved handle for use in connection with a tool such as a float trowel, an edger, groover, roughing roller and line roller used in making concrete, sidewalks and other structures, the object of the invention being to provide a handle which may be arranged at any desired angle or in any desired position with respect to the blade or tool in connection with which it is used.

The invention consists in the construction, combination and arrangement of devices hereinafter described and claimed.

In the accompanying drawings;—Figure 1 is a side elevation of a sidewalk trowel provided with an adjustable handle constructed in accordance with my invention. Fig. 2 is a similar view with the socket portion of the handle shown in section.

My improved handle comprises a pair of members detachably and adjustably secured together by members which effect a ball and socket joint. In the embodiment of the invention here shown the member 1 is a curved shank having at one end a base 2 adapted to be attached to a floating trowel blade 3 or other tool or tool blade and provided at the upper end with a spherical head 4 hereinafter referred to as the ball. The handle member 5 may be of any suitable length and is provided at its inner end with a pair of substantially semi-tubular clamping jaw members 6 which are formed at their free ends with substantially semi-spherical members 7 which form a socket to receive the ball, the said clamping jaw members being also provided with a frusto-conical portion 8, which is exteriorly threaded and which is engaged by a sleeve nut 9 which has a tapered, threaded bore. The clamping jaw members are here shown as attached to the handle member 5 by a rivet 10. They may be secured thereto by any suitable means.

This construction of the handle is two members connected together by a ball and socket joint coupling enables the handle member 5 to be arranged at any desired angle or position with respect to the tool, thus greatly facilitating the use of the tool and in a number of positions. By unscrewing the sleeve nut the clamping jaw members, which are resilient spring apart to loosen the grip of the socket members on the ball and permit adjustment of the handle member 5. When said handle member has been arranged in the desired position the sleeve nut 9 is then screwed up on the tapered threaded portion 8 of the socket member, thus drawing the socket parts 7 toward each other and clamping them rigid on the ball.

Having thus described my invention I claim:—

In combination with a tool shank having a spherical head formed thereon, a socket comprising a pair of semi-tubular members, the confronting edges thereof engaging each other for a minor portion of their length and spaced apart for a major portion of their length, one end of each of the members being formed with semi-spherical portions to form a socket, said spherical head being mounted within said socket, a semi-circular and tapering thickened portion formed on each of the members adjacent the spherical portion and having their exterior surfaces threaded, a nut having a tapering threaded bore, said nut engaging the semi-circular thickened portion to clamp the jaws together, and a handle mounted in the opposite end of said tube.

In testimony whereof I affix my signature in presence of two witnesses.

MARTIN M. FORD.

Witnesses:
FRANK SCOFIELD,
CHAS. E. SNAVELY.